Oct. 10, 1944.  J. G. PRITCHARD  2,360,273
PRINTING MECHANISM
Filed Dec. 6, 1939   2 Sheets-Sheet 1
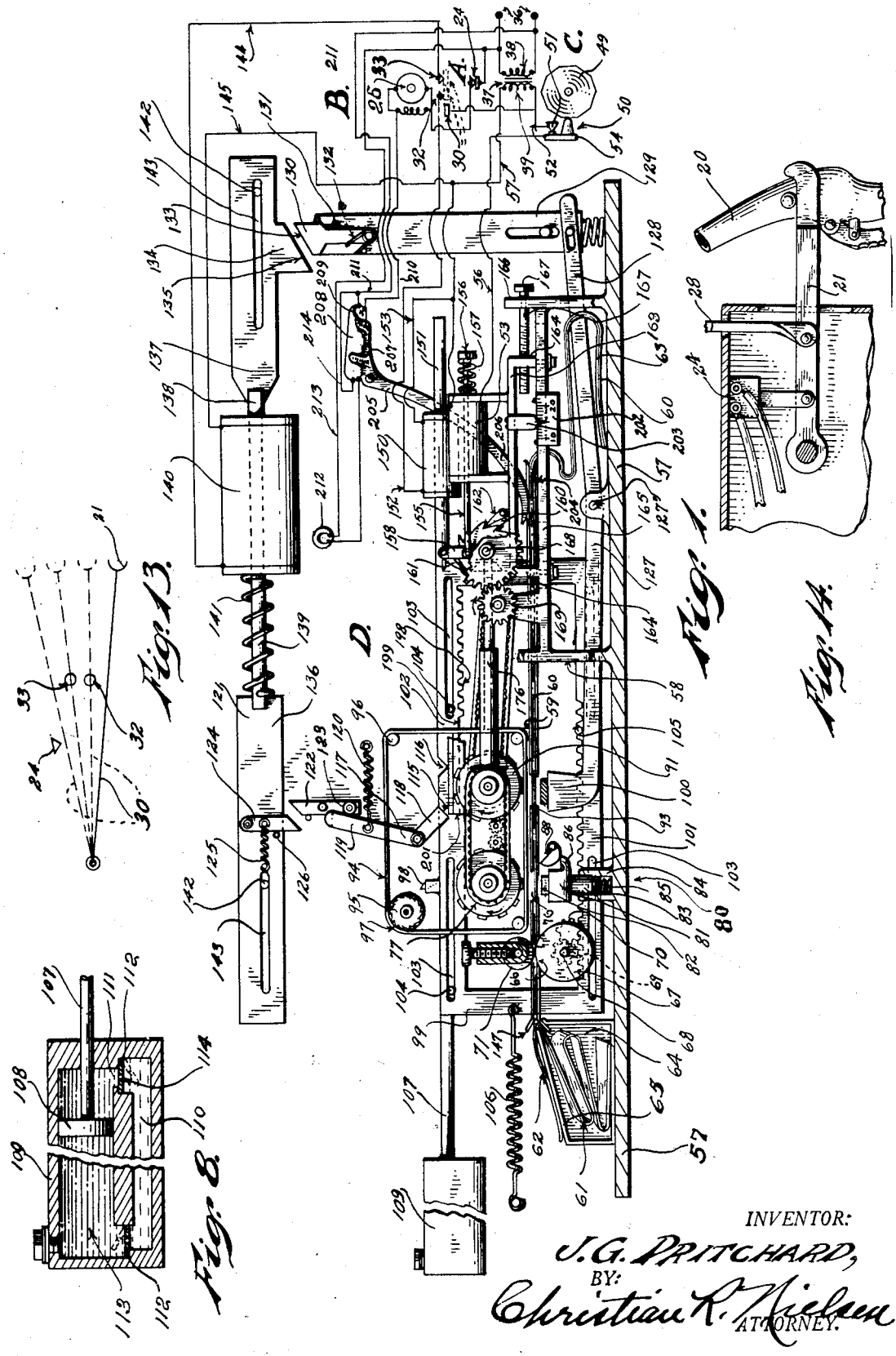
INVENTOR:
J. G. PRITCHARD,
BY:
Christian R. Nielsen
ATTORNEY.

Oct. 10, 1944.  J. G. PRITCHARD  2,360,273
PRINTING MECHANISM
Filed Dec. 6, 1939  2 Sheets-Sheet 2
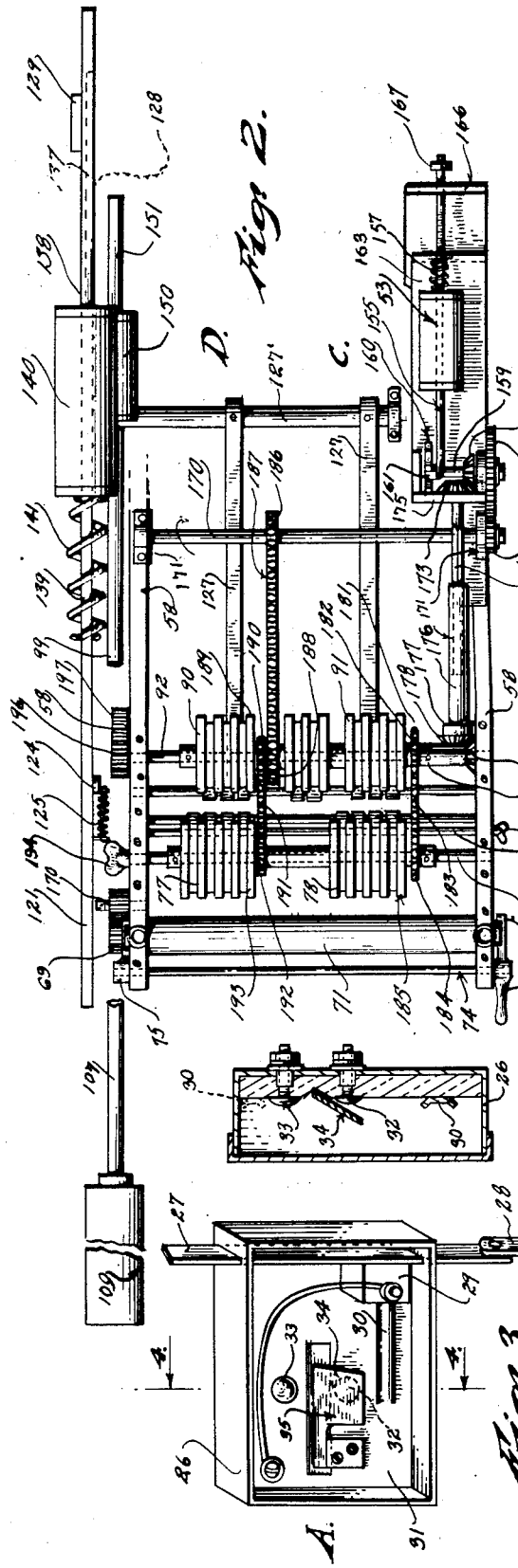
INVENTOR:
J. G. PRITCHARD,
BY:
Christian L. Nielsen
ATTORNEY.

Patented Oct. 10, 1944

2,360,273

UNITED STATES PATENT OFFICE 2,360,273

PRINTING MECHANISM

Joseph Gordon Pritchard, Seattle, Wash.

Application December 6, 1939, Serial No. 307,935

3 Claims. (Cl. 101—288)

The invention relates to a liquid quantity and cost measuring devices for liquid dispensing devices, and has for an object to present an apparatus adapted to use with ordinary liquid dispensing apparatus to make a record by which a customer may be assured of having recevied the full quantity of liquid bargained for.

The invention is particularly valuable for use at gasoline dispensing stations and on tank trucks such as now used for delivering fuel oils, and especially in the delivery to domestic or commercial plants, where the truck driver—without observation of the customer, as a rule—merely uncaps a tank filler pipe and introduces a hose from a pump on the truck by which the fuel is pumped from the tank of the truck to the customer's storage tank. There are at present available on such tanks metering devices with printing arrangements by which there is printed on a sales slip the reading of the meter at a moment before delivery of the customer's order, and by which a second print is made of the reading at conclusion of the delivery.

It has been found that drivers have set the mechanism to print the initial reading before reaching a customer's plant, have run off a quantity of fuel at a place at which delivery was not authorized, have then proceeded to the customer's plant and made the remainder of a delivery authorized, after which the second reading of the meter was stamped on the sales slip, showing an apparent delivery of the full order, whereas in fact, that quantity of fuel which was delivered at the first place was not received by the customer, and the actual delivery was less than that amount. At gasoline filling stations fraud is also possible by analogous practices and others.

It is therefore a most important object of this invention to give means by which such a fraud can not be perpetrated, except by disturbances of the electrical circuits or a mechanism not readily understood by truck drivers, and even then involving difficulty in avoiding discovery.

A further important aim of the invention is to present a novel liquid-flow responsive device for operating registering devices of the nature indicated. It is a still further object to offer a novel printing device operative at the proper times in the actuation of the dispensing appliance.

In such appliances it is necessary to so design the cost registering device so that it may be adjusted to accord with frequent price changes, and it is an important desideratum in my invention to enable the quick and simple adjustment of my device to this end, with a relatively inexpensive mechanism and one which will be reliable and durable.

Another object of importance is to provide such a device which will indicate when the operation of the pump is interrupted exceptionally. In such appliances a sales slip record on paper is provided, and it is a peculiar purpose of my invention to include a reset for the item cost accumulator, but to prevent this reset before the final total imprint and ejection of the record slip.

Another aim of the invention is to present apparatus readily adapted to use with present types of pump apparatus readily adapted to use with present types of pump dispensing devices, to enable use of commercially available sales slip manifold stock and other convention mechanism including accumulator wheel structures with reset arrangement for reset by one rotation of internal devices in the accumulator wheels, and to enable use of other stock constructions of necessary elements.

An advantage sought is the presentation of novel means to give an all-total record at will: a novel signal device to indicate lack of proper record sheet in the machine; novel multiple-impulse operating devices, particularly that involved in the initial action control in response to moving the dispensing hose to discharge position; and novel means to effect the proper movement of the record sheets and their ejection.

A specific object is to present a novel form of connection between a fluid movement responsive mechanism and a fluid quantity recording device and a price-cost recording device.

Additional objects, advantages and features of invention reside in the construction, arrangement and combination of parts involved in the embodiment of the invention, as will be understood from the following description and accompanying drawings, wherein Figure 1 is a side elevation of a system and mechanism embodying my invention with side frame structure omitted, and showing electrical switches, circuits and units A, B, and C, diagrammatically.

Figure 2 is a top view thereof with the ink ribbon and record strip omitted.

Figure 3 is a detail of a main control or nozzle switch unit embodied as an auxiliary to the ordinary gasoline dispensing pump device, and to be connected to the hose-hook, lever, or hanger lever.

Figure 4 is a section on the line 4—4 of Figure 3.

Figure 5 is a horizontal section of a fluid motor and electrical impulse transmitting device or telegraph unit for operating my bulk and price recording means from the flow of gasoline and other fuel oils.

Figure 6 is a vertical longitudinal section of the fluid motor on the line 6—6 of Figure 5;

Figure 7 is a section on the line 7—7 of Figure 5;

Figure 8 is a detail of a dash-pot device for checking final movement of the record ejector.

Figure 9 is a detail perspective of the accumulator wheels.

Figure 10 is an elevation of the star and ratchet wheel element of the accumulator wheel element.

Figure 11 is a perspective of the pawl and spur wheel.

Figure 12 is a detail of the rack frame.

Figure 13 is a diagram of the operation of the nozzle switch.

Figure 14 is a detail of a formal showing of a conventional gasoline dispensing pump hose-supporting lever and my switch link 28 incorporated therewith.

There is illustrated a system which includes four units which may be located at widely separated points but working together to the ends in view, and ordinarily located close to the normal position of the nozzle or hose by which the material is dispensed, the quantity and cost of which is to be registered and recorded.

These units consist of what will be termed the "nozzle switch" A, which may be mounted within the usual dispenser case containing the fuel dispensing indicator mechanism of a gasoline sales station or "filling station," and is adapted to be connected to the ordinary nozzle hook or lever usually found in the prior dispensing devices spring-supported and which is depressed when the dispensing nozzle is suspended thereon.

The second of the operative units consists of the electric motor and pump at B, by which the fluid to be dispensed is delivered to the dispensing nozzle. Such motor and pump are a common feature of commercial fuel dispensing stations, and the details are therefore not illustrated.

The third unit is a fluid motor and interrupter unit C, which must be incorporated at some point in the conduit through which the fluid pumped by the motor flows to the dispensing nozzle, and may be located on the outlet of the usual pipe to which the familiar nozzle hose is attached, so that its movement may be observed by the patrons and operators of the station. The ordinary hose and nozzle may then be connected to the discharge side of my liquid motor unit.

The fourth unit is the recorded unit D, and may be located either in the above mentioned dispenser case or at a distance in the office of the fuel sales station, or cashier's box, or otherwise, as desired.

*The nozzle switch—Unit A*

In the present instance my nozzle switch unit is so constructed that the conventional control of the motor is utilized without change, so as to operate as always, by starting the motor when the nozzle 20 is lifted from the hook lever 21 familiar in dispensing stations. The hook lever is usually pivoted a distance inwardly of the front wall of a standard dispenser case 22 in which a slot 23 is formed for free movement of the lever. Various types of switches 24 are employed to be operated by this lever to close a circuit to the motor 25. The details of the switch will not be here illustrated since the specific features thereof comprise no novel part of my invention, and the switch is formally indicated on Figure 1. My special switch unit consists of a small switch case 26 adapted to be mounted on the wall of the case 22 near the slot 23, and in the present instance includes a vertical slide 27 adapted to be connected by a link 28 to the lever 21, so that it is reciprocated when the lever is oscillated. Attached to this slide by suitable insulation 29 is a horizontally projected switch blade 30, close to a main wall of insulation 31 in the case on which wall two vertically spaced insulated contacts 32 and 33 are fixed, upon which the blade may wipe successively as it moves from its lower limit to its upper limit of movement. The lower contact 32 is spaced a short distance above the initial or lower position of the blade, and the contact 33 is spaced from the first sufficiently for the blade to clear the first before engaging the second; and the second contact is located a distance below the upper limit of movement of the blade in normal operation when connected to the hook lever 21 and the nozzle is lifted from the hook.

Also mounted on the back wall 31 of the case 26, there is an insulated fender 34, consisting of a special form of leaf spring having a tongue 35 extended over the lower contact 32, and so inclined that the blade 30 may pass upwardly thereunder in engagement with the contact 32, but on downward movement the blade will ride over the fender and so be held out of contact with the terminal 32. This tongue may be either made of insulating material or metal with its inner edge adapted to engage the insulation beside the contact 32 before engaging the latter when the tongue is depressed.

The switch 24 for starting and the motor 25 are connected in a standard service supply circuit 36, which may be the standard 110-volt current supply. The system in the remainder of my system, however, preferably utilizes a modified current, for safety and economy, evolved from a transformer 37, the primary 38 of which is connected across the supply line 36. The blade 30 is connected to one side of the secondary 39 while the contacts 32 and 33 are connected through respective normally open circuits to the other terminal of the secondary, as will be explained, for the operation of a printer and a paper feed, respectively.

*The fluid actuated telegraph—Unit C, Figs. 2—5—6—7*

The fluid motor device consists of a conduit case 40 having an inlet fitting at one end 41 adapted to be screwed onto the outlet pipe from a liquid dispensing device, and an outlet end 42 adapted to be connected to the usual flexible hose through which the liquid is discharged into the customer's tank. Immediately, this conduit is enlarged and shaped to receive a rotor 43 suitably mounted and shaped to be rotated by the liquid flowing through the device, and in the present instance being formally indicated as a simple shaft 44 and radial paddles 45 mounted at one side of a projection of the passage in the conduit, and concentric with the enlargement of the conduit, which is all on one side of the axis of the ends 41 and 42. The shaft 44 is extended through one wall of the conduit, and into a simple housing 46 mounted on the side of the conduit case. This rotor is preferably so constructed as to rotate a multiplicity of turns for each gallon of liquid which passes, and through a reduction gearing 47 in the housing it drives a countershaft and cam 48—49, by which a circuit maker and breaker 50 is operated, constructed in a conventional form. The cam has preferably ten high points, and is so geared to the rotor as to make one turn for each gallon of liquid passing the motor 40. The maker and breaker 50 in the present instance includes a stationary contact 51 from which a wire 52 leads to one end of the secondary 39, and a pivoted spring-loaded contact arm 54 tending to be held in contact but having the usual wiper 55 to be engaged by the high points of the cam to hold the circuit open. A wire 56 leads to the arm 54 from one terminal of a solenoid 53; while a wire 57 from the other end of the secondary leads to the solenoid 53 to complete the circuit thereto. By means of this device, as long as liquid flows through the motor 40 intermittent contacts will be made at the maker and breaker, in number proportionate to the quantity of liquid passing, and in the present instance one contact for each one-tenth of a gallon. These contacts will transmit electrical impulses which are to be utilized in the Unit D in the recording of the quantity of liquid passed and its cost at a given price per gallon, as will be explained.

The Recorder—Unit D

While this unit may be embodied in various forms, the present example includes a base plate 57, on which suitable side frames 58 are provided to properly support the elements of mechanism of the unit. Between these and spaced above the plate 57 there are closely spaced horizontal, planiform guide plates 59 extending longitudinally in the recorder a suitable distance, and receiving slidably therebetween a set of manifold sheets 60 of conventional type, including a lower permanent record sheet 61 and an upper customer's record sheet 62. These are in the form of continuous strips having a folded supply portion or stack 63 held over the plate 57 adjacent the inner ends of the plates 59. The plates 59 extend to a delivery end of the frame work, where they diverge and the strips pass forwardly therefrom. A box 64 is provided at this point, having a slotted top arranged to receive and receiving the lower strip 61 therein while the upper strip 62 passes over the top plate of the box, which slopes downwardly at a suitable angle to permit its use as a writing support. The plates 59 are transversely slotted near their forward ends as at 66, to receive through the lower plate a milled feed roll 67 mounted on a transverse revoluble shaft 68 carried by the side frames 58 and projecting at the left side where a gear 69 is fixed thereon, meshing with a reversing gear 70 at the lower side, to be operated as will be described. Over and alined with the roll 67, there is a rubber faced pressure roll 71 mounted revolubly and also for vertical movement in the side frame and spring loaded at the upper side in any approved manner to be held yieldingly against the rolls 67 or the interposed manifold stock 60. Means is provided for releasing the paper between the rolls consisting of a hand lever 72 having an arm 73 engaged under the shaft of the roller 71 and fixed on a transverse rod 74 revoluble in the side frames and having on its opposite end an arm 75 alined with the arm 73 so as to engage under the other end of the revoluble shaft. Operation of the lever will consequently lift both ends of the roll 71 simultaneously. These rolls 67 and 71 may be termed feed rolls. The plates 59 are also transversely slotted at 76 a distance longitudinally inward from the slots 66 in alinement with two spaced apart independent sets of accumulator number wheels 77 and 78, at the left and right hand sides of the machine respectively, carried on a transverse shaft 79 mounted on the side frames 58. The operation of these will be subsequently explained. They are formed with the usual raised peripheral series of digits and cipher against which the paper 60 may be pressed by a device operating through the slots 76, constituting a printing means 80 in the present instance operated manually for reasons to be explained. It consists of a transverse bar 81 having a rubber cushion 82 on the upper side, and at the lower side having downwardly extended plunger supports 83 engaged in guide members 84 and having springs 85 confined thereunder tending to thrust the bar upwardly until stopped by the number wheels, but tending to hold the bar yieldingly in cleared position. The bar 81 has one or more projecting parts 86, fixed rigidly therewith, and just above and outwardly of these a transverse shaft 87 is revolubly mounted in the side members 58, clear of the projections but having cam elements 88 thereon with a lobe portion adapted to engage the projection and press it downward on movement of the cam in one direction, and having a drop side adapted to clear the projections abruptly and allow the bar to be thrust rapidly upward, so that its momentum will carry it into engagement with the superposed number wheels with sufficient force for printing as will appear hereinafter. The cam is shaped so as to retain a position engaged with the projections of the bar so as to hold the latter in position with the cushon 82 clear of the paper 60. On one end conveniently for manual operation there is provided a knob or handle 89, by which it may be turned as required.

Still further spaced longitudinally inward from the accumulator wheels mentioned there are two sets of item accumulators 90 and 91 for money and goods respectively, and of a construction similar to that of the accumulators 77 and 78. The item accumulator wheels are mounted on a transverse shaft 92 mounted on the frame 58, and under these there are two slots 93 in each of the guide plates 59 under which a printing hammer 100 operates automatically, as will be explained. An ink transfer ribbon 94 is mounted in any approved manner in the machine, passing between all the accumulators and the guide plates 59, and moved by any usual means. In the present instance, the ribbon is indicated as an endless one, orbitally supported on rolls 95 and 96 and one of the supporting rolls at 95 may have a ratchet wheel 97 thereon moved on each operation of the device by a pawl device 98 carried on a reset and paper feed rack frame 99 arranged longitudinally of the machine and longitudinally reciprocable, being mounted on the left hand side of and outwardly of the frame 58. This rack comprises a rectangular frame having parallel lower and upper members 101 and 102, each having suitable teeth on their opposed sides and meshed with gears to be named. The rack is indicated as having longitudinal slots 103 receiving a suitable number of pins 104 therethrough for its slidable support, but other support forms may be substituted as required. The rack teeth 105 on the lower rack 101 are meshed with the gear 70, so that as the rack moves forwardly, it causes the feed roll 67 to be rotated rapidly to feed the paper strips 60 forwardly. The gears 69 and 70 being smaller than the diameter of the roll 67, the latter will feed a length of paper 60 longer than the extent of movement of the rack. Any construction may be utilized whereby the feed rolls 77 will move the paper only in the forward direction. It may include the lever 72, which may be depressed while the rack is returned to initial position. The rack has connected thereto a contractile spring 106 anchored in front of the machine and tending to draw the rack frame to the forward limit of its movement. From the upper part of the rack frame a rod 107 is extended forwardly and engaged with a piston 108 in a dash pot cylinder 109, having a by-pass conduit 110 communicating with its opposite ends at ports 111 in which check valves 112 are mounted, both adapted to open to flow of liquid 113 in the cylinder when the piston moves rearwardly, which is to the right as viewed in Figure 8, and being formed with bleed apertures 114 by which return of the piston by the spring will be suitably retarded.

The upper side of the upper bar of the rack frame is formed with two notches, 115 and 116, respectively, the remainder of the top surface of the bar being planiform, and a dog 117 is pivoted thereabove in the form of a bell crank pivoted at its angle, one arm 118 of which extends rearwardly while the other arm 119 extends upward and is engaged by a contractile spring 120 anchored rearwardly and tending to cause the arm 118 to bear against the upper side of the rack, so that it will enter the first notch as the rack moves forwardly when the rack has been drawn to its rearwardmost position and released; and also, when the dog is moved pivotally in opposition to the spring and immediately released, it will likewise enter the second notch on further forward movement of the rack. This dog is operated by a plunger 121 mounted for horizontal slidable movement longitudinally of the machine above the dog through the agency of a trip device on the plunger, which includes a small lever 122 of the first class pivoted on a fixed pivot adjacent the upper end of the arm 119, and having a pendant arm provided with a wiper 123 arranged to engage the rear side of the arm 119 and press the latter forwardly at times, and an upwardly projecting arm positioned in the path of a trip lever 124 of the second class pivoted on the plunger and dependent to engage the end of the lever 122. The lever is spring loaded at 125 and held forwardly against a stop pin 126 at a vertical position, so that when it moves rearwardly it will wipe the upper end of the lever 122 rearwardly and cause the wiper to move the upper arm 119 of the dog forwardly dis-engaging the dog from the notch 115 or 116, in which it happens to be engaged.

The plunger is also utilized to operate the printing hammer 100, for which purpose the hammer is mounted on lever arms 127 fixed on a transverse rock shaft 127' mounted on the frame 58, and having a rearwardly extended arm 128 connected at its extremity to the lower end of a spring-balanced vertical slide 129. The plunger 121 is extended over this slide, which is formed with a trip wiper 130 pivoted thereon to swing in the general direction of movement of the plunger, but checked against rearward movement past an initial upper position by a stop 131, and spring pressed by a torsion spring 132 at the forward side to hold it yieldingly in this position. Its upper end is formed with an inclined face 133 presented forwardly, and on the plunger 121 a depending right wiper 134 is formed having a similarly inclined lower side 135 presented toward the rear so as to engage and wipe the face 133 of the trip when the plunger moves rearwardly. The forward side of the wiper 134 is vertical, as is the rear side of the trip, and the latter is extended and clear on its rear side so that when the wiper has moved rearwardly thereof and returns the two may co-engage and the trip be swung forwardly, allowing the wiper to pass without undue impedance.

The plunger is shown as consisting of a forward plate 136 having the trip 124 thereon, and a rear plate 137 having the wiper formed thereon, these plates being connected by a rod and core element 138—139, the forward part 139 of which is of magnetic material and the rear part 138 of which may be of non-magnetic material, if desired, to obtain the best advantage. These connecting parts are arranged on the axis of and to reciprocate in a solenoid coil 140, by which the device is operated. A spring 141 confined between the solenoid core mounting and the forward plate 137 serves to hold the plunger yieldingly at the forward limit of its movement where it is stopped by one or both of two pins 142, engaged in longitudinal slots 143 in the respective plates 136—137. These pins may also be utilized to support the plunger free of the coil 140. The engaging ends of the trip 124 and lever 122 may also be formed with opposed sloping faces in the same relation as those of the trip 130 and wiper 134, and it is important to note that the space between the latter two parts is less than that between the former two when the plunger is at initial position, as in Figure 1. In consequence, the slide 129 will be depressed and the printing hammer operated before the dog 117 is disengaged from the notch 115 or 116 of the rack frame and before movement of the record sheet occurs; and operation of the paper feed will begin immediately after the operation of the printing hammer, in each instance.

From the upper contact 33 of the nozzle switch, a wire 144 is run to one end of the coil 140, while from the other end of this coil a wire 145 is extended to that end of the secondary 39 opposite the connection of the wire 52 therewith. It will thus be understood that with the parts in the positions shown in Figure 1, when the nozzle switch is operated by removal of the nozzle 20 from the hook lever 21, and the latter swings to the upper limit of its movement, engagement of the blade 30 with the upper contact 33 will cause an initial operation of the printing hammer operating on the accumulators 90 and 91, and feeding of the sales slip to position for a later recording. Likewise, the blade 20 having moved above the contact 33, when the nozzle is returned to the hook lever 21, returning the same to initial position, the blade in its downward movement will again engage the contact 33, resulting in a second operation of the printing hammer, followed by a second operation of the dog 117, which will then be in the second notch, and there being no further notches for this dog to engage, the rack frame will be moved to its full forward limit, a sufficient movement for projection of a full sales slip forwardly from between the guide plates 59. A shearing blade 147 may be provided over the departure ends of the plates 59, so that the sales slip 148 or customer's record formed on the top sheet 62 may be lifted thereagainst and severed, while the duplicate slip formed by the manifold means incorporated is retained in the sales record box 61.

In each operation of the dog 117 the dash-pot device at 118 will serve to cause the rack frame to move gently to its next position without shock or jar to the machine or mechaninsm. The rack 99 is moved to set or cocked position against the action of the spring 106 by the operation of a solenoid coil 150 which may be termed a cocking means, the core 151 of which is connected to the rear end of the rack frame. From one end of the coil 150 a wire 152 is extended to the contact 32 of the nozzle switch 26, while from the other end of the coil a wire 153 is connected to the secondary 39 opposite the wire 52. In consequence, when the nozzle is removed from the hook lever 21, before the switch blade 30 engages the contact 33 in the upward motion of the blade, it will engage the contact 32, closing the circuit through the solenoid 150 and causing the rack frame to be moved to cocked position ready to respond to release movements of the dog 117.

It has been seen that the telegraph unit is arranged to transmit comparatively frequent impulses to the solenoid 53 as long as liquid passes the motor element 40, and this is utilized to operate a plunger 155 connected to a core 156 in the solenoid, the core being held yieldingly at its rear limit of movement by a spring 157. The plunger is connected to a lever 158, pivoted on a transverse shaft 159 of a ratchet wheel 160, and on which the wheel is fixed. A pawl 161 is mounted on the end of the lever engaging the teeth of the ratchet to move it counter-clockwise as viewed in Figure 1, and a detent dog 162 is provided to prevent reverse rotation of the ratchet wheel.

The solenoid, and the ratchet in the present instance, are mounted on a carriage frame 163, arranged longitudinally of the machine, having downwardly extended legs 164 resting slidably on the upper side of an elevated bar 165 forming part of the right hand side frame 58, these legs having narrowed parts extended through suitable slots in the bar 165, so as to support the frame 163 properly. At the rear part of the bar 165 a stud 166 is formed through which there is revolubly engaged and held against longitudinal movement an adjusting screw 167, the threaded shank of which is engaged in the rear leg 164, so that on rotation of the screw the leg and frame 163 will be moved longitudinally in a corresponding direction. On the extremity of the shaft 159 there is removably fixed a gear 168, meshed with a smaller gear 169 mounted on a transverse shaft 170, carried in bearings 171 on the side frame members 58. Also fixed on the shaft 159 there is a bevel gear 172, meshed with a similar gear 173 fixed on a shaft 174 projected forwardly and carried in a bearing 175 on the carriage frame 163. The forward end portion of the shaft 174 is angular in section and engaged slidably in a correspondingly angular sleeve of tubular shaft 176 carried in a bracket bearing 177 on the inner side of the adjacent side frame 58, and having fixed on its forward end a bevel gear 178 meshed with a like gear 179 fixed on a sleeve shaft 180 engaged revolubly on the shaft 92 carrying the accumulators 90 and 91. The first wheel 181 at the right hand side of the group 91 may be fixed on the shaft 180, and also mounted on the latter shaft there is a sprocket 182, from which an endless chain 183 is extended forwardly to a sprocket 184 attached to the first number wheel 185 at the right hand side of the accumulator group 78 on the shaft 79.

On the shaft 170 a central sprocket 186 is mounted from which an endless chain 187 extends to a sprocket 188 fixed with the first wheel 189 at the right of the accumulator group 90, and a second sprocket 190 is also fixed with this wheel, from which an endless chain 191 is extended around a sprocket 192 on the first wheel 193 at the right of the accumulator group 77.

The accumulator devices 90 and 91 are of a well known construction now manufactured by the Veeder-Root Company, and also similar to ones used by the National Cash Register Company, in which number wheels and associated devices are so constructed that a reverse movement of the shaft 92 through 360 degrees will reset all the wheels thereon to a zero or starting position, and so that the wheels can not be turned by movement of the shaft otherwise.

It will be understood therefore that by the operative connection through gears 168 and 169 and chains 187 and 191 the cost of each sale item will be recorded on the wheels of accumulator 90, and the item aggregate of liquid in gallons and tenths will be recorded by the accumulator 91; and that the accumulators 77 and 78 will likewise register the same amounts and quantities, and are intended to show the grand totals for an extended period not affected by resetting of the devices 90 and 91. The accumulators 77 and 78 may be constructed without the resetting construction, if desired, although the shaft 79 is shown with a resetting key 194, so that it may be manually reset at times. There is a space between the accumulators 90 and 91, in which a series of three similar counting wheels 195 are mounted on the same shaft 92, but preferably without resetting connections with the shaft, and these wheels are intended to print on a sales slip the price per unit of the commodity sold, which in the case of gasoline would be the price in cents per gallon in the present instance. As this price is changed only occasionally and will be the same for a great number of sales extending over months as a rule, the wheels may be adjusted by hand to the necessary figure, as required.

In order to effect resetting of the individual sale accumulators 90 and 91, the shaft 92 is extended at the left hand side of the machine, and has fixed thereon a gear 196 meshed with a reversing gear 197 which has its upper side at a higher level (see Figure 12) being fixed on a counter shaft 92', and positioned to mesh with teeth 198 on the underside of the upper rack member 102 of the rack frame 99. These teeth are interrupted at a proper point 199 on the bar 102 and the underside of the bar relieved so as to clear the gear as the rack frame is in its final movement rearwardly (to the right in Figures 1, 2 and 12) this being also a part of the cocking movement a certain distance, and the shaft 92' is formed with a flat 200 which is at the upper side when the last tooth 198 clears the gear 197. On the rack bar 102 there is provided an offset flange 201 having a horizontal lower edge disposed so as to engage slidably over and close to or upon the flat 200 when the relieved part of the bar passes rearwardly over the gear 197. This checks movement of the shaft 92' and gear 197 and prevents rotation of the shaft 92 in either direction after the rack teeth 198 clear the gear on rearward, or cocking movement of the rack frame. Likewise, it insures the meshing of the gear 197 with teeth 198 on subsequent movement of the rack.

It will be appreciated that the normal accumulating movement of the wheels 90 and 91 is clockwise as viewed in Figure 1, and by interposition of the reversing gear 197 between the gear 196 and the rack, when the rack frame moves rearwardly in response to the pull of the coil 150, the shaft 92 will be rotated counter-clockwise, thus having no effect on the position of the number wheels. That is to say, when the rack is at its forward limit, at any time that the nozzle 20 is removed from the lever 21, and the circuit to the solenoid 150 is closed, the rearward movement of the rack frame—or cocking—by the solenoid will not affect resetting of the accumulators 90 and 91 as shaft 92 will turn freely in a counter-clockwise direction.

On the bar 165 of the right side of the frame 58, a scale 202 is provided and on the carriage frame 163 a pointer 203 is fixed movable in close relation to the scale. When a change of price per sales unit of the commodity being dispensed is made, it is necessary to substitute a different size gear 168 for the one previously used, and a set of these gears is required, the number of teeth on which differs, the scale of stages of difference being related to price differences of one-half per unit in the present instance. The scale and pointer last mentioned are calibrated in relation to the differences in diameter of the several gears, so that by operation of the screw 167 the shaft 159 may be so adjusted in relation to the shaft 170 that the proper gear 168 may be put in place with proper operative relation and effect.

As a precaution against the operation of the dispensing pump and devices without paper for proper recording of the commodity disposed of and the cost charge, I have formed slots 204 in the guide plates 59 near their rear ends, and at a suitable point and level thereabove I have pivoted on a stationary pivot an arm or lever 205, extending forwardly and downwardly and with a suitable curved end portion 206 resting in the slot 204 of the upper plate and supported by the paper of the manifold sheets when in place. If no paper is present, the end of the lever drops further through the slots 204 by gravity, due to the forward inclination of the arm 205. At its upper rear part above the pivot, the lever is formed with a mercury switch mounting arm 207, and at normal position of the arm 205, when resting on paper in the guide, the arm 207 will incline downwardly toward the rear, substantially as in Figure 1. Mounted suitably on this arm 207, there is a mercury tube switch 208, having two contacts in each end and a globule 209 of mercury therein, adapted to close the gaps between the contacts at the respective ends of the tube alternatively when it is inclined correspondingly. The contacts at the lower or right hand end of the tube are connected to respective wires 210 and 211, the one leading to the motor and the other to one side of the power service circuit 36, and forming one side of the circuit through the switch 24. In consequence, should there be no paper in place in between the guide plates 59, the extremity of the lever 205 will fall through the openings 204 and its movement thereby is sufficient to tilt the tube 208 in the opposite direction from its initial inclination, opening the current to the motor and bridging the contacts at the opposite end, closing a circuit through a signal lamp 212 and wires 213 and 214 to the power service line 34.

In operation, the parts being assembled in a dispensing system as described, and current being available at 36, the rack frame being in uncocked position, when the service attendant removes the nozzle 20 from the hook lever 21, the latter moves upward by action of the usual spring device ordinarily incorporated therein, and through connections between the lever 21 and slide 27 the switch blade 30 is moved upward, contacting the lower contact 32 and thereby actuating the solenoid 150 and effecting cocking movement of the rack frame to the right, where it is held by the dog 118, as in Figure 1. The blade 30 next engages the contact 33, causing first operation of the solenoid 140, depressing the slide 129, and actuating the printing hammer 100 to cause the zero setting on the wheels 90 and 91 to be imprinted on the manifold forms in guide plates 59. The blade then moves on so as to clear the contact 33. An instant later the trip 124 engages lever 122 causing release of the dog 117 from the first notch 115, which permits movement of the rack frame forward to the left a short distance, the lower rack 101, through gear 70 and feed rolls 67 moving the first print on the sales slip a short distance from the accumulators, and position a new impression on the sales slip beneath the number wheels 90 and 91. In this movement of the rack motion is not imparted to gear 197 as the gear is then in the interrupted part 199 of the rack 198, and the shaft 92' held stationary by the offset 201 and flat 200. Movement of the lever 21 continues a short distance further beyond the last involved position, thereby closing the switch 24, and initiating operation of the motor pump unit B, establishing a head in the dispensing tube. If the nozzle 20 is closed by the usual stop and valve on the nozzle, no other action occurs and no liquid flows from the nozzle. When the nozzle is opened, liquid flows therethrough from the conduit fitting 40, actuating the rotor 43 and initiating operation of the maker and breaker 50 by the cam 49 in the telegraph Unit C.

The flow of liquid continues as long as the hand valve on the nozzle 20 is open, and during this time the succession of electrical impulses caused by the cam 49 will be transmitted to the solenoid 53. This will actuate the ratchet and pawl 160—161 so that the small counter shaft 159 is rotated and through the gear 168 the cost accumulators 90 and 77 operated, while from the same shaft, through the bevel gears 172—173, 178, 179, the quantity accumulators 91 and 78 will be operated. When the dispensing operation has been concluded, the operator releases the spring lever on the nozzle, which closes the valve therein and then hangs the nozzle back on the hook lever 21. The weight of the nozzle draws the lever 21 downward, carrying with it the slide 27, and moving the switch blade 30 downward upon the contact 33, energizing the coil 140 again, and causing actuation of the hammer 100 as before indicated, which prints the totals on accumulators 90 and 91, followed immediately by the second release of the dog 117, disengaging it from the second notch 116, so that the rack frame is moved to its forward limit by spring 106 with its speed controlled by dash-pot 109, projecting the sales slip 62 over the box 61 where it may be grasped and removed, and moving the duplicate into the box. At the beginning of the downward movement of lever 21 switch 24 is opened thereby stopping the operation of pump Unit B. As rack frame 99 starts moving forward when dog 117 is disengaged from the second notch 116, flange 201 clears the flat 200, rack 198 and gear 197 mesh, causing gear 197 through gear 196 to turn the shaft 92 clockwise 360 degrees at least, and thus reset wheels 90 and 91 to zero in preparation for registering the next sale of liquid from the dispensing unit.

This completes the cycle of operation. The gross accumulator wheels 77 and 78 were not disturbed during the resetting operation. These registers are accumulating the number of gallons sold during any period and the value of such gallons at the price determined by gear 168.

It has already been explained how the device functions to indicate when the sales slip supply is exhausted, and prevent discharge of liquid until restocked with the record sheets.

In case of a change of price of the commodity, the necessary change in operation of the cost accumulators is effected by removal of the gear 168, adjustment of the carriage frame 163 by the screw 167 until the pointer 203 indicates the proper change of position on the scale 202, after which a gear 168 of different size, proportionate to the change is put in place on the shaft 159. In the case of gasoline, the changes ordinarily occur in units of one-half cent, in the United States and Canada, and with the ratchet responding to ten impulses for every gallon, it is convenient to have the gears 168 vary from each other by one-half the total number of teeth on the gear 169 from each half cent variation in price, and making the transmission from the gear 169 to the accumulators 90 and 77 in a 1 to 1 ratio.

It will be understood that while there has been presented a specific showing of the invention, this is purely exemplary, and various modifications and changes in construction, arrangement and combination may be made therein without departing from the spirit of the invention, as more particularly set forth in the appended claims.

Register devices of the general kind indicated at 90 and 91 accumulators herein, and resettable by rotation of a shaft engaged commonly through a group of digit wheels are shown in a number of patents. In the patent to Green, 1,920,375 dated August 1, 1933, and the patent to Pankouin, 1,506,939, dated September 2, 1924, show such constructions in which the resetting shaft may turn in the same direction as the number wheels when moved for item accumulation; while the following patents also show register devices adapted to my use by substituting the gear 196 of my disclosure for the reset key shown in the patents: Spaunberg, No. 2,040,026; Northrop, No. 2,040,027; and Spaunberg, No. 2,040,031; May 5, 1936.

I claim:

1. In a machine of the character described a record sheet feed and printing means consisting of a printing member, and an impression receiving means adapted to receive a sheet movable therebetween, a sheet feed including a reciprocating member, yieldable means tending to hold the reciprocating member in paper discharging position, a trip device, said trip and reciprocating member constructed to cooperate in at least two positions of the reciprocating member to hold the reciprocating member releasably against said yielding means, an impression member movable to press the sheet against the printing member, electrical means to operate the impression member and to operate the trip device, and electrical cocking means for the reciprocating member, means to operate the printing member, and an operation control consisting of a switch device having an initial position, and at least two contacts spaced longitudinally of the path of movement of the switch device, the first in its movement from initial position being connected to close a circuit to the cocking means for the reciprocating member, the second being short of the extreme position of the switch and adapted to be engaged on movement of the switch in each direction and connected to close a circuit to the first named electrical means, and means to insulate the switch from the first named contact on return from full stroke position.

2. In a combined paper feed and printing device comprising a printing member and means to feed a sheet to the printing member and including a spring-loaded reciprocating full-stroke member, tending to move the sheet to final position past the printing member, cocking means to move the reciprocating member to initial position, means to retard sheet-feeding movement of the reciprocating member, said reciprocating member having at least two notches or the like, a dog constructed to engage therein and movable to release the reciprocating member and return to engaging position, said dog including an upper release element movable in a direction to release the dog, a second reciprocating member movable in the same direction and return, having a trip thereon yieldable to said release element under opposite movement of the second reciprocating member and constructed to move the same to release the dog, an operating member for the printing member having a movable spring-loaded part adjacent the path of the second reciprocating member, an operating element on the second reciprocating member to engage the spring-loaded part and move it operatively in said one direction, the last named two parts being constructed to yield one to the other under opposite movement of the second reciprocating member, the said operating element on the second named reciprocating member being advanced to engage and operate the printing member before engagement of said trip and upper release member, and means operative subsequently to said cocking means to move the second reciprocating member operatively two or more times in the intervals of operation of the cocking means.

3. The structure of claim 2 in which the operating means for the two said reciprocating members comprise spring loading means tending to move the two members to respective initial positions and respective electrical means to move them oppositely, and a switch device including contact means operative on initial movement of the switch to close the circuit to the cocking means and contact means operative a plurality of times on each operation of the switch to close the circuit to the means to operate the second named reciprocating member.

JOSEPH GORDON PRITCHARD.